United States Patent [19]

Cinadr et al.

[11] Patent Number: 5,216,088
[45] Date of Patent: Jun. 1, 1993

[54] TWO-STEP PROCESS FOR POST-CHLORINATING POLY(VINYL CHLORIDE)

[75] Inventors: Bernard F. Cinadr, Brecksville; Arthur L. Backman, West Lake, both of Ohio

[73] Assignee: The B. F. Goodrich Company, Akron, Ohio

[21] Appl. No.: 837,180

[22] Filed: Feb. 18, 1992

[51] Int. Cl.$^5$ ................................. C08F 8/22
[52] U.S. Cl. .................... 515/356; 515/331.6
[58] Field of Search .......................... 525/356

[56] References Cited

U.S. PATENT DOCUMENTS

| | | | |
|---|---|---|---|
| 3,287,336 | 11/1966 | Taylor | 525/331.6 |
| 3,532,612 | 10/1970 | Weber et al. | 525/331.6 |
| 3,591,571 | 7/1971 | Van Gaver | 525/331.6 |
| 3,597,342 | 8/1971 | De Vita et al. | 525/331.6 |
| 3,632,848 | 1/1972 | Young et al. | 260/92.8 AC |
| 4,039,732 | 8/1977 | Schoen et al. | 525/331.6 |
| 4,350,798 | 9/1982 | Parker | 525/331.6 |
| 4,386,189 | 5/1983 | Ackerman et al. | 525/358 |
| 4,412,898 | 11/1983 | Olson et al. | 204/159.18 |

OTHER PUBLICATIONS

"Studies in Organic Peroxides. XXV. Preparation, Separation and Identification of Peroxides from Methyl Ethyl Ketone and Hydrogen Peroxide" by Milas, N. et al.

Primary Examiner—Bernard Lipman
Attorney, Agent, or Firm—Joe A. Powell; Alfred D. Lobo

[57] ABSTRACT

A two-step process for the post-chlorination of PVC homopolymer and other predominantly vinyl chloride-containing polymers is disclosed, which process produces chlorinated PVC ("CPVC") containing at least 70% by weight Cl, in a fast, but controllable, aqueous, two-step process catalyzed using an organic peroxide catalyst instead of actinic radiation. Less than 10% excess Cl remains after the second stage, even when 75 wt% Cl CPVC is made. In the first step, an aqueous slurry of PVC is chlorinated in the absence of liquid chlorine and free oxygen, preferably at a starting temperature in the range from about 30° C. to 75° C., in the presence of at least an essentially stoichiometric amount of chlorine required to make the desired Cl content in the end product, and, a catalytic amount of the peroxy catalyst, at least sufficient to produce 'first step CPVC' having an intermediate Cl level of chemically bound Cl in the range from 67% to 72% by weight. The temperature is maintained below the $T_g$ of the first step CPVC formed. In a second step, the first step CPVC formed is further chlorinated in the presence of less than a 10 wt % excess of chlorine, at a temperature in the range from 90° to 130° C. until the Cl content in the CPVC is in the range from 69% to 75% by weight. At least a 3% increase in Cl content of the first step CPVC is obtained within about 30 min irrespective of the volume of the slurry. Preferably, a substantial excess of chlorine is not used, and no remaining chlorine needs to be recovered. CPVC with a 75% Cl content is made in about 3 hr. The CPVC end product so obtained is unexpectedly more easily thermoformed than another CPVC end product having the same Cl content, but made by a prior art aqueous process.

18 Claims, 7 Drawing Sheets

TWO-STEP PROCESS FOR POST-CHLORINATING POLY(VINYL CHLORIDE)

BACKGROUND OF THE INVENTION

Chlorinated poly(vinyl chloride) resin (hereafter "CPVC") has gained in popularity for use in extruded pipe, cable jacketing and structural components for buildings, mainly because of its stability. However, such popularity is tempered by the fact that commercially available CPVC having a chlorine content above 69% is difficult to process. Such CPVC is commercially prepared mainly by the chlorination of an aqueous suspension of microporous PVC macrogranules ("granules" for brevity) in the presence of UV (ultraviolet) light radiation (referred to as the "photo-slurry process"). In some processes the UV-light may be varied during the process (referred to as "light ramping"); and in others, the temperature may be ramped ("temperature ramping"). In each case, the result is a macrogranular porous CPVC product characterized by a high concentration ("conc") of chlorine (Cl) per unit of surface area ("Cl/unit area"), in chains near the surface of a macrogranule. Such a CPVC product is difficult to extrude or mold because of the relatively poor fusion characteristics of a mass of such granules.

Stated differently, the fusion temperature of CPVC from the photo-slurry process is higher than it would be if the Cl content was the same, but the Cl/unit area was lower. All reference to "Cl content" herein refers to chlorine chemically bound in the polymer chains of the resin. Granules which have a desirable Cl content above 69%, and so distributed as to allow them to be easily fused are referred to as "being essentially uniformly chlorinated".

Further, despite the advantages of the photochlorination (or "photo-slurry") process in which UV-light provides initiation of the reaction, there are conspicuous disadvantages. Among the main advantages are: excellent heat transfer; no catalyst residue in the product because no catalyst is used; and no residue of any diluent or swelling agent because neither is used. Among the main disadvantages are: a small reaction zone circumscribed by the depth of penetration of the UV-radiation; relatively very long reaction time for obtaining a Cl content of more than 67% in the CPVC product.

Numerous processes, other than photochlorination, have been proposed, but the predominant commercial photo-slurry process is disclosed in U.S. Pat. No. 4,412,898 to Olson et al. Except for the liquid chlorination processes, such as one disclosed in U.S. Pat. No. 4,350,798 to Parker, we are unaware of any process which does not produce CPVC having a high Cl conc near the surface. We know of no prior art process which yields 72% Cl CPVC which is fusible so as to provide a continuous phase at 170° C.

The goal of the present invention is to provide a controllable organic peroxide or peroxyester catalyzed (all such compounds with a peroxy linkage are hereafter referred to as "peroxy compounds" and the reaction as being "peroxy-catalyzed"), non-photochlorination process to chlorinate PVC homopolymer in an aqueous slurry, and to make a CPVC macrogranular product with a Cl content of at least 70% by weight (% by wt, or "% Cl") with a lower concentration of chlorine near its surface than can be obtained with any commercial process; and, to do so in a commercial reactor in which reactor productivity is at least doubled, compared to that of a conventional reactor used in the photo-slurry process. Most of all, such CPVC is to be made without sacrificing product quality.

We reached the goal with a two-step process; in the first step, PVC is chlorinated with molecular chlorine until it contains from 67-72% by wt Cl, at a relatively low temperature in the presence of an organic peroxy compound; and in the second step, the Cl content of the CPVC produced in the first step ("first step CPVC") is then increased by at least 3% to within the range from 70% to about 75% Cl, within a surprisingly short time, not more than about 3 hr even for 75% Cl content, by chlorination at a relatively higher temperature than that used in the first step, preferably in the presence of from 1-100 ppm of molecular oxygen and/or additional peroxy catalyst which may be the same as, or different from that used in the first step.

The temperature and time factors which affect the activity of organic peroxy catalysts which are short-lived under even highly favorable conditions, the general disinclination to use such catalysts and solvents therefor, both of which remain in the product, and the inherent sensitivity of a highly exothermic free-radical chlorination reaction, militated against the choice of an organic peroxide-catalyzed water-chlorination reaction.

To avoid photochlorination and the use of a swelling agent, Ackerman et al in U.S. Pat. No. 4,386,189 disclosed a high-pressure process in which they chlorinated PVC resin in aqueous 10-30% hydrochloric (HCl) acid in the presence of a sufficiently large excess of liquid chlorine to form a distinct liquid chlorine phase, and catalyzed the reaction with a solution of organic peroxy compounds.

In greater detail, Ackerman et al suspended granules of PVC (57% by wt Cl) in 24% HCl acid, and rid the suspension of oxygen by sparging nitrogen through it. Gaseous chlorine was then sparged through the suspension to drive off the nitrogen. A large excess of liquid chlorine was then slowly added to the suspension at room temperature which was mixed to ensure thorough contact between chlorine and PVC resin to ensure the presence of a liquid Cl phase. To this suspension was then added a mixture of organic peroxy compounds dissolved in appropriate solvents. The suspension was heated until the temperature of the suspension began to rise to a maximum of 75° C., whereupon the temperature was modulated to stay in the range from 55° C.-70° C. Upon obtaining the desired Cl content in the CPVC produced, remaining excess chlorine was vented, and residual chlorine (with the product) is removed by sparging nitrogen through the suspension. A slurry of the CPVC product was then filtered and dried. The CPVC recovered had a specific gravity of 1.575 indicating a Cl content (covalently bonded) of 67%.

The Ackerman et al process relied upon the use of a large excess of chlorine and aqueous 10-30% HCl the presence of which affected the reactivity of the peroxides they used. As a result they sought to limit the temperature of their reaction to about 75° C. To maintain a desirably low temperature, they must remove the heat of reaction, as evidenced by the large difference between the reaction temperature and the temperature of the water in the jacket (see Example 1 where the reaction temperature is above 75° C. but the jacket temperature is 10° C.). The limitations of the Ackerman et al process dictate that their chlorinated resins contain from about 62-69% by weight chlorine.

In contrast, our process is specifically directed to making CPVC resin having a chlorine content of at least 70%, typically about 72-73%. Yet to make a Cl content in the range from 70-75%, we prefer to use no more than a slight excess, less than 10 % by wt over stoichiometric of the Cl required to yield the desired end product; we add no HCl, and carry out the bulk of the reaction at a temperature below 90° C., the second step of our process being run at from 90° C.-130° C.

The novel process relies mainly upon the unexpected effectiveness of certain organic peroxy compounds in an acidic environment essentially free of liquid chlorine. It is unnecessary to remove a large amount of heat, the jacket temperature being the same as, or higher than that of the reaction mass during most of the reaction, so that a portion of the reaction proceeds substantially adiabatically. In other words, we may start with a cool reaction, remove no heat during the remainder of the first step of the reaction, and heat during the second step, to keep the temperature of the reaction mass desirably high.

The significance of Ackerman et al carrying out the reaction in the presence of an excess of chlorine and a large amount of aqueous (say 10-24% HCl) cannot be overlooked because the concentration of peroxide catalyst is typically very low, in the range from $10^{-4}$ to $10^{-5}$ mole/liter and is affected by the concentration of hypochlorous acid (HOCl) in the slurry being chlorinated. When the slurry contains 10.9% HCl (the formality of electrolyte is 3.987) the concentration of HOCl is $1.1 \times 10^{-6}$ mole/liter; when the slurry contains 18.8% HCl the concentration of HOCl is only $6.2 \times 10^{-7}$ mole/liter (see "The Solubility of Chlorine in Aqueous Solutions of Chlorides and Free Energy of Trichloride Ion" by M. S. Sherril and E. F. Izard, Research Laboratory of Physical Chemistry, Massachussets Institute of Technology, J. Am. Chem. Soc., Vol 53, pg 1667, May 1931). Without the addition of HCl to the system we have less than 0.5% HCl, typically from 0.05 to 0.1 moles/liter of HCl (about 0.18% to 0.36% HCl) equivalent to 0.05 to 0.1 moles/liter of HOCl. This difference in HOCl concentration between the Ackerman et al system and that of this invention, is more than 10 times (one order of magnitude); it is more than three orders of magnitude ($10^3$) different.

In an earlier post-chlorination process described in U.S. Pat. No. 3,632,848 to Young et al, PVC is chlorinated in an aqueous suspension at a temperature above 100° C. to eliminate the induction time typically required in a slurry process, generally, and to help drive all oxygen from the suspension. However, at a temperature of 100° C. the relative partial pressure of chlorine is so low that there is less than 3% chlorine in the suspension. At such low concentration, despite the reaction being carried out above the glass transition temperature ($T_g$) of the PVC resin, there is so little CPVC formed in each granule, that even if all the chlorine is immediately reacted, the dense CPVC formed on and within each granule does not initially slow down the rate of chlorination. However, as the reaction proceeds, enough dense CPVC is generated to form an increasingly effective barrier to infiltration of Cl radicals, and both the rate of chlorination and the concentration of Cl in the macrogranules begin to reach a limit. As stated in the '848 patent, after 139 minutes, Cl conc reaches 68.4% Cl in the final product.

Figure 1:
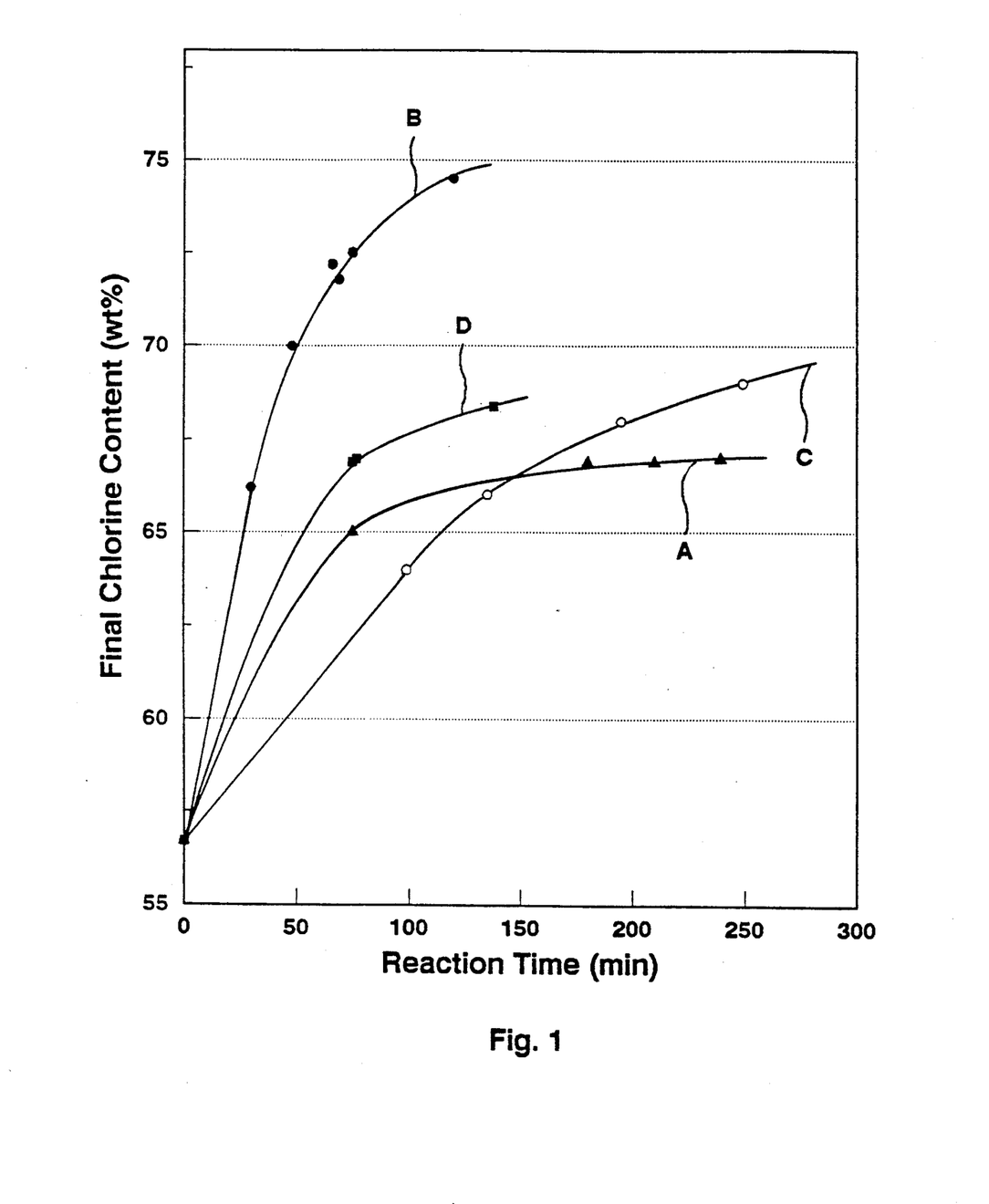
FIG. 1 graphically illustrates the course of several different reactions including the one embodying the process of our invention, in each of which reactions the % Cl in the CPVC is plotted against the time during which the reaction proceeds.

This blocking effect of Cl introduced near the surface is more readily appreciated by reference to the appended FIG. 1 in which several curves, each for a different process are presented.

Curve 'D' graphically represents the % Cl in the CPVC as a function of time of reaction, for the runs in Table II of the Young '848 patent. Though the curve 'D' is initially steep, as the %Cl increases, the denseness of the CPVC near the surface of each granule greatly impedes access of additional Cl. radicals, and the curve flattens out. Clearly it will take very much longer to reach 70% Cl.

It will be noted that Ackerman provides no data for the initial portion of the curve, from 57% Cl (see example 1 col 8, line 50, which is a typical Cl content of commercial PVC) to his first point, 65% Cl after 75 min (see his example 4). Therefore the curve 'A' is smoothed to the 57% point.

In sharp contrast, the effect of our two-step process is graphically illustrated in a representative curve, identified as 'B' in FIG. 1.

There are several advantages of our two-step process: (1) it does not require the use of added aqueous HCl; this obviates the necessity to recover, purify and recycle the HCl; (2) it does not require the use of a large excess of chlorine, which obviates the necessity to recover, purify and recycle the chlorine; and, (3) the reaction proceeds with a controlled rate of generation of heat which requires little, if any heat removal initially, then proceeds at elevated temperature in excess of 100° C. in the second step. These features make a commercial reactor a practical reality. Further, not only is the product CPVC of excellent quality, but its high conc of Cl, in the range from 70-75%, is distributed throughout the granules so that the concentration of Cl near the surface is lower than it would be in any known, commercial aqueous chlorination process.

SUMMARY OF THE INVENTION

A highly exothermic but controllable two-step process has been discovered for chlorinating solid porous vinyl chloride resins in an aqueous suspension, essentially without using actinic radiation, without the use of sufficient chlorine to form a distinct liquid phase in the reaction mass, and without adding any aqueous HCl acid to the mass at any time after catalytically initiating the reaction with an organic peroxy compound. Each step of the process is carried out under conditions such that the relative pressure of chlorine is always less than 1, and preferably, there is too little free chlorine left after the second step (relative pressure <0.1), to warrant recycling the free chlorine; more preferably, essentially no excess free chlorine is left.

It is therefore a general object of this invention to provide a two-step process in which the first step is initiated at ambient or relatively low temperature from above 35° C. to below 70° C., essentially in the absence of oxygen, but in the presence of an organic peroxy catalyst having a decomposition temperature corresponding to a 10 hr half-life in the range from about 30° C. -130° C., present in an amount insufficient to adversely affect the physical characteristics of post-chlorinated resin when incorporated therewithin, preferably in the absence of a transition metal salt, until an intermediate plateau of Cl content in the range from 67% -72%, more preferably from 68% -71%, is reached in the CPVC at a temperature above 75° C., preferably in the range from 90° C.–100° C.; the second step may be carried out in the absence of added catalyst and in the absence of oxygen, at a temperature above 100° C. until the Cl content of the resin is at least 3% higher than that of the first step CPVC, that is, in the range from 70% to 75% by wt. Preferably, the second step is carried out in the presence of from about 10 ppm to 100 ppm of free oxygen at elevated temperature above 100° C., and/or additional organic peroxy catalyst, preferably also in the absence of a transition metal salt, which additional peroxy catalyst may be the same as, or different from that used in the first step.

It is a specific object of this invention to provide a two-step process, in the first step of which we chlorinate PVC homopolymer having a Cl content in the range from about 55% to about 58% in an aqueous suspension, commencing at a relatively low temperature below 75° C. and continuing up to about 100° C., in the presence of from 0.5% but less than 10% stoichiometric excess of chlorine over that required to make the desired Cl content of the CPVC end-product, and a catalytic amount of a peroxyester, hydroperoxide or dialkyl peroxide catalyst having a 10 hr half-life in the range from 50° C.–120° C., in the substantial absence of oxygen, until the Cl content is in the range from 68–69% by wt. In the second step, we continue the chlorination reaction, maintaining an excess of Cl from 0.5% to 10% over stoichiometric, and a catalytic amount of a peroxyester, hydroperoxide or dialkyl peroxide which preferably has a 10 hr half-life in the range from about 100° C.–200° C., in the presence of from about 5 ppm but less than 100 ppm of molecular oxygen until the Cl content of the CPVC product is in the range from 70–75%.

More particularly, a commercially viable two-step process has been discovered for chlorinating solid microporous granules of PVC in an aqueous suspension, in a two-step process; in the first step, PVC is converted in the presence of an organic peroxy catalyst, to first step CPVC having a sufficiently high Cl content to enable the first step CPVC to be further chlorinated in a second step, in the presence of oxygen, and, optionally additional organic peroxy catalyst, to gain at least 3% Cl content within about 30 min at a controllable temperature lower than the $T_g$ of the CPVC formed, substantially independent of the volume of slurry in the reactor while the second step is being carried out. The higher the desired Cl content of the CPVC end product, the longer the overall time of the chlorination reaction. A Cl content of about 75% in the end product may be obtained, starting with 57% Cl PVC, within about 3 hr, the time being measured from the time in the first step, when the aqueous reaction mass charged with chlorine is warm enough to react sufficiently to decrease the relative pressure in the reactor (referred to as the "relative pressure curve rolling over"). The resulting CPVC product, whatever its Cl content in the range from 70–75%, is chlorinated intragranularly, with a sufficiently low Cl conc near its surface so as to result in physical properties which are unexpectedly quite distinct from a CPVC product of like Cl content, but made by any known process, specifically any commercial, aqueous process.

It is therefore a general object of this invention to provide a mass of CPVC granules having a Cl content in the range from 70% to 75%, which CPVC is fusible at a lower temperature than CPVC granules having the same Cl content but made by any known process, specifically, and aqueous photoslurry (photochlorination) process.

It is another specific object of this invention to provide the foregoing two-step process comprising, using in the first step, an organic hydroperoxide derived by reacting an aliphatic ketone, preferably a $C_1$–$C_5$ (lower alkyl) ketone, with hydrogen peroxide.

It is a specific object of this invention to provide a two-step process for post-chlorinating an aqueous suspension of a granular microporous PVC resin until CPVC end product formed contains a designated amount of Cl in the range from 70–75%, the process comprising, in a first step, (a) confining the aqueous suspension of PVC in a pressurizable reaction zone maintained at a temperature in the range from 20° C. to about 50° C., wherein the PVC is mixed with no more than a 10% excess of molecular chlorine over that required to form the desired CPVC end product, but insufficient to provide a distinct liquid chlorine phase, so as to form an acidic suspension of the PVC in the absence of added aqueous hydrochloric acid;

(b) adding an effective amount of an organic peroxy catalyst selected from the group consisting of peroxy carboxylic acid esters, diorganoperoxycarbonates, diacyl peroxides and mixed anhydrides of organic sulfoperacids with carboxylic acids, preferably a catalyst which has a decomposition temperature lower than 80° C., most preferably a hydroperoxide derived from a lower alkyl ketone and hydroperoxide, in an amount sufficient to initiate chlorination of the PVC, preferably from 0.005–0.5% by wt, while maintaining temperature of the suspension below 100° C. for a period sufficient to provide a first step CPVC product having from 67–70% by wt Cl chemically bound within the resin; and, in a second step, (c) introducing a catalytic amount of oxygen-containing gas, optionally generated in situ, also in the absence of added aqueous hydrochloric acid, and optionally with additional said peroxy catalyst and/or molecular chlorine in an amount insufficient to provide a distinct liquid chlorine phase; and, (d) raising the temperature from below 100° C. to a temperature no higher than 130° C. for a time sufficient to allow additional chlorine to react with the CPVC from the first step, until the relative pressure of Cl is less than 0.1 when the designated level of Cl in the polymer is attained, which level is at least 3% higher than that of the first step CPVC, yet without exceeding the glass transition temperature of the CPVC end product formed.

BRIEF DESCRIPTION OF THE DRAWING

The foregoing and additional objects and advantages of the invention will best be understood by reference to the following detailed description, accompanied with graphical illustrations of the progress of preferred embodiments of the process, and the effects thereof on the CPVC product produced, in which illustrations.

DETAILED DESCRIPTION OF PREFERRED EMBODIMENTS

The preferred embodiment of the two-step process of this invention is described relative to post-chlorinating PVC with an organic peroxy catalyst, most preferably, at least in the first step, a hydroperoxide having a relatively high decomposition temperature. The preferred peroxy catalyst permits control of a highly exothermic reaction so long as the reaction proceeds in two steps, each step carried out under the particular process conditions specified, which conditions allow control of the reaction.

It is well known that the reaction of organic peroxides and the reaction products of such reactions are highly dependent upon the decomposition medium (see Product Bulletin on Lucidol* brand PEROXYESTERS sold by Atochem Chemicals). The medium of this invention is an aqueous slurry of PVC granules to which slurry is added a substantially stoichiometric amount of Cl, without the addition of HCl to the slurry. By "a substantially stoichiometric amount" we refer to an amount which includes a small excess, less than 10 wt % over stoichiometric, of Cl. Typically such excess in the second step is in the range from about 0.5% to 5%, though in some cases, particularly where more than 73% Cl content is desired, there may be more than 5% but less than 10% excess Cl remaining. No liquid chlorine is present during the reaction, except during the time chlorine is introduced as a liquid, if it is so introduced. Such a medium (aqueous PVC slurry with less than 10% Cl excess over that required to make the end product, preferably a substantially stoichiometric amount of Cl) provides an oxidizing environment due to the presence of at least 0.01 mole HOCl/liter of slurry, preferably from 0.05 to 0.1 mole HOCl/liter of slurry. Such an environment is unlike that of a highly acidic slurry, acidified with added HCl and containing a liquid chlorine phase.

It will be appreciated that in the first step, described hereinabove, an intermediate Cl content of from 67-72% by wt is typically reached in first step CPVC which may be recovered as the end product. However, an end product with a higher Cl content will generally be the desired end product of this two-step process. Though the first step CPVC product having 72% Cl or lower, can be readily made and recovered, the detailed description of the invention will not specifically refer to recovery of the first step product.

The detailed description is limited to CPVC end product having a Cl content at least 3% by wt greater than that of the first step CPVC made, typically a CPVC end product with Cl in the range from 70-75% by wt, and specifically a product having from 71-73% Cl. A product with as much as 76% by wt Cl may be made but its processability compares too unfavorably with that of CPVC having a Cl content of 72-75%; further, the properties of 75-76% Cl CPVC are not sufficiently better than those of 72-74% Cl CPVC to warrant making the product at this time.

The PVC useful in the present invention is the homopolymer of vinyl chloride obtained by either the mass or suspension polymerization techniques, in the form of porous solid macrogranules. The term "macrogranules" is used herein to define a cluster or aggregate of randomly closely packed primary particles of polymer. A handful of macrogranules has the feel of fine sand, and are also referred to as "grains". Macrogranules of PVC which are converted to CPVC will typically have an average diameter in excess of 20 μm (micrometers), with a preponderance of particles in excess of 50 μm in diam. A preferred size distribution of each macrogranule is in the range from about 50 to about 500 μm and conventionally ranges from about 100 to about 200 μm. Each macrogranule is made up of a multiplicity of primary particles each in the size range from about 0.05 μm to about 5 μm, and more typically in the range from about 0.5 μm (5,000 Å) to about 2 μm (20,000 Å). The bulk of the primary particles are usually submicron in size, though conditions of polymerization will determine the actual size distribution of both primary particles, and also, macrogranules. Macrogranules can be characterized by their porosity, that is, internal pore volume, and surface area.

The morphology of PVC and CPVC macrogranules, specifically the porosity and surface area, are important properties which determine the physical properties of the polymer after it is molded. Since CPVC is generally derived by the chlorination of PVC, it has been found that the properties of product CPVC may be tailored to a large extent by precisely controlling the conditions under which precursor PVC is polymerized.

Though it is desirable to use highly porous PVC as a starting material to get high chlorination rates, the properties of the CPVC product obtained are generally too poor to meet commercial standards. Therefore, a viable choice of PVC starting material depends in large measure on the characteristics of the process to be used. Since the choice of process must be made with a view to using a particular starting material, it will be evident that this interdependence leaves no obvious choice as to how a "fix" on each selection is to be had.

Most preferred as a starting material is a suspension polymerized PVC having a porosity in the range from about 0.28 to about 0.35 cc/g, a surface area in the range from about 1.0 m2/g to about 3 m2/g, and an inherent viscosity in the range from about 0.95 to about 1.2, that is, having a relatively high molecular weight. The molecular weight of PVC may be related to its inherent viscosity which is determined herein by dissolving 0.24 gram of the resin in 50 ml of cyclohexane while mildly heating and agitating on a solution roller. The solutions are then filtered into an appropriate Ubbelohde viscometer, previously calibrated for the pure solvent. The flow times in seconds for the solutions are determined at four different dilutions to obtain flow data at a number of concentrations. A portion of the original filtered solution is dried to constant weight at 130° C. to obtain a true concentration value. The ratio of the flow time of the solution to the flow time of the pure solvent is a value known as the "relative viscosity." The "inherent viscosity" is defined with respect to relative viscosity as follows:

Inherent
viscosity = $n_1 = (2.303/C)(\log_{10} n_{rel}) = \ln(n_{rel}/C)$ where
C is the concentration of PVC (in gm)/100 ml The PVC resin starting material useful in the process of this invention preferably has a high molecular weight such that it possesses an $n_1$ (inherent viscosity) in the range from about 0.5 to about 1.4, the most commonly used PVC resins having an $n_1$ in the range from about 0.8 to about 1.1, or slightly higher.

To produce chlorinated CPVC commercially, and preferably profitably, it has been found that a relatively concentrated aqueous suspension of PVC must be chlorinated. But the exotherm from such a relatively concentrated suspension is difficult to control, hence the importance of the proper choice of hydroperoxide catalyst. By "relatively concentrated" we refer to a concentration of about 15 to about 35% by wt of PVC solids in the suspension. Since the physical characteristics of such a relatively concentrated suspension of PVC in water are quite different from those having relatively low concentrations, the problems of chlorination in each are quite different, such factors as viscosity of the suspension, clumping of macrogranules, diffusion of gases into and out of the liquid and solid phases present, inter alia, not lending themselves to extrapolation by known methods. It has been found that a concentration of PVC higher than the specified range results in product with an unacceptable concentration of "fish eyes", while concentrations below 15% yield good product, but the process is not economical.

By "aqueous suspension" of PVC we refer to a slurry-like mixture of PVC macrogranules suspended in water. Though, initially the water is not deliberately acidified by the addition of acid, HCl acid is formed when chlorine, whether liquid or gas, is dissolved into the aqueous phase, and during the course of the chlorination. The above-specified concentration of PVC in the suspension is found to yield high output of CPVC for a given reactor volume, without sacrificing the quality of the product, which quality cannot be compromised. This process is particularly directed to a batch process since wholly different considerations enure to the operation of a continuous process.

It is essential for the purpose of obtaining the desired CPVC product, that oxygen be removed from the aqueous suspension, and from within the PVC granules, before chlorination is initiated. This may be effected in any convenient manner. For example, a hot suspension at a temperature in the range from about 50° C. to about 75° C., and containing about 30% PVC may be introduced into a batch reactor and subjected to a vacuum at that temperature so that it boils. Lower temperatures as low as about 20° C. may be employed, but removal of oxygen at such low temperatures is impractical, particularly since the temperature of the suspension is to be raised if it is to be chlorinated by the process of this invention. Removal of oxygen is assisted by agitation of the suspension.

Though any organic peroxy compound which provides free radicals at a temperature lower than about 70° C. may be used in the first step of our process, the decomposition temperature alone of the peroxy compound is not indicative of its effectiveness. For example, though peroxydicarbonates are found to have a catalytic effect in our process, their effectiveness does not compare favorably to that of the organic hydroperoxides and peroxyesters.

There would be no logical reason to expect that a hydroperoxide or dialkyl peroxide might be an effective catalyst, much less one which is more effective than the others. In the universe of peroxy catalysts capable of generating free radicals which might enhance the chlorination of PVC, it cannot be logically deduced which will generate free radicals in a liquid chlorine environment; or, in an environment of aqueous HCl acid in which chlorine is dissolved; or, in an aqueous environment in which chlorine is dissolved. Nor can it be known under what conditions of temperature such radicals will be generated, if they are generated at all; or, if so many will be generated that the resulting exothermic chlorination reaction will defy control.

Depending upon the temperature and the presence of other ingredients of the reaction mass, one skilled in the art would not know to what extent the peroxy catalyst itself might be chlorinated, whether such chlorination would lead to "inert" compounds unreactive with PVC at that temperature, or if radicals will be generated, and what effects they might produce, if any.

Further, since the chlorination of a large mass of PVC at a temperature in the range from ambient (say 20° C.) to 75° C. would result in the release of a very large quantity of heat in a very short time, it will be appreciated that the use of peroxyesters and hydroperoxides for a commercial reactor would logically be shunned.

Preferred peroxyesters, particularly for the first step, are t-amylperoxyneodecanoate (Lupersol*546M75), 3-hydroxy-1,1-dimethylbutylperoxyneodecanoate (Lupersol 610M50), 1,1-dimethyl-3-hydroxybutyl-peroxyneoheptanoate (Lupersol 688M50), t-butylperoxypivalate (Lupersol 11), t-butylperoxyneodecanoate (Lupersol 10), di(2-ethylhexyl)peroxydicarbonate (Lupersol 223), di(sec-butyl)peroxydicarbonate (Lupersol 225), and acetylcyclohexylsulfonylperoxide (Lupersol 228-Z).

Preferred peroxyesters, particularly for the second step, are t-butylperoxy-2-ethylhexanoate (Lupersol PMS), and t-butylperbenzoate.

Combinations of t-butylperoxypivalate and acetylcyclohexylsulfonylperoxide, or, methylethylketoneperoxide and t-butylperoxy-2-ethylhexanoate, are particularly effective.

Most preferred peroxy catalyst for the first step is a hydroperoxide having a structure selected from the group where
R is a hydrocarbyl group having from 4 to 24 carbon atoms;
$R^1$ and $R^2$ represent $C_1$-$C_{20}$ alkyl, or $C_7$-$C_{24}$ aralkyl, most preferably $C_1$-$C_6$ alkyl, and $R^1$ and $R^2$ may be the same or different, and,
n represents an integer in the range from 1 to 6, preferably 1, 2, 3 or 4;
and, said hydroperoxide is used in an amount less than 0.5% by weight of the PVC resin, preferably in the range from 0.005% to 0.05%. Typically only enough is used to form first step CPVC having an intermediate Cl level about 3% lower than the % Cl content of the end product CPVC without exceeding the $T_g$ of the CPVC end product resin in the reaction mixture.

Such hydroperoxides would seem to be particularly inapt from the standpoint of their relatively high decomposition temperatures, but their reactivity is surprisingly high. Specifically, methylethyl ketone (MEK) peroxide has a decomposition temperature of about 80° C. (half life of 10 hr). Since the first step, in the best mode, is preferably initiated at a temperature below about 50° C. to enable one to control the exotherm, one would expect the decomposition rate of MEK peroxide at below 50° C. to be too slow to be effective. However, under acidic conditions, and in the absence of free liquid chlorine, it is unexpectedly effective.

A large excess of chlorine is unnecessary to swell the granules of PVC and function as a reactive swelling agent. The effective chlorination of PVC in our process proceeds so that in the second step there is typically only a substantially stoichiometric amount required to produce the end-product; product; when a CPVC end product having from 72–73% Cl is made, there is typically less than 5%, preferably less than 1% by wt Cl remaining in the reactor after the second step. No swelling agent other than Cl is necessary, and none is present. The amount of chlorine in the PVC granules decreases the $T_g$ of the granules well below the $T_g$ of the PVC alone. Yet, because of the presence of the chlorine, the reaction with PVC proceeds apace, in so short a time that, though the temperature of reaction exceeds the $T_g$ of the PVC granules in suspension, there is essentially no evidence of generation of dense agglomerates, or dense glassy granules ("fish-eyes") which provide evidence of the $T_g$ of the PVC granules having been exceeded over too long a period of time.

We sought to avoid recycling excess chlorine, and to avoid carrying out the reaction under conditions which would require removal of substantially all the heat of reaction. In the most preferred embodiments of the process we have done both.

The result is not only that we have reached our aforestated goals, but we have also provided a CPVC product which is fusible at a lower temperature than one would expect for a Cl content of at least 70%.

No HCl is added to the aqueous suspension of PVC in our process. Nor is there present a sufficient excess of chlorine to provide a distinct liquid chlorine phase at any time during the reaction.

Evidence of the effect of a lower Cl concentration near the surface is provided by comparing the fusion temperatures of samples of CPVC having the same overall Cl concentration (say 70%) made by processes the effects of which are being compared. Fusion temperatures are conveniently measured by a simple "button" test. In this test, a sample of polymer is placed in a mold for a disc (referred to as a "button"), and the mold heated to a temperature at which a cohesive button is formed. In general, the lower the temperature at which the button forms, the better the processability of the CPVC. The presence of a continuous phase is evidenced by a clear button, that is, one which is substantially light-permeable.

In a typical process, PVC granules are slurried in deionized water in a jacketed pressurizable reactor fitted with a stirrer and conventionally equipped with a thermocouple in the slurry, safety features such as a vent with relief valve and the like. Molecular oxygen is then removed from the slurry by any conventional means. For example, the slurry is brought up to about 35° C. and sparged with nitrogen. An alternative procedure is to heat the slurry to about 75° C. then subject it to a vacuum, repeating the procedure until the measure concentration in the slurry is less than 50 ppm, preferably less than 5 ppm.

Only a substantially stoichiometric amount of chlorine is introduced, either as a liquid or a gas, sufficient to produce the desired Cl content in the CPVC end product. The chlorine swells the granules. Since the initial Cl content of PVC is typically about 57%, and it may be raised to up to 75%, the stoichiometric amount of chlorine to be introduced is 135% by weight of the PVC. The stoichiometric amount of Cl (% by wt) to be added to the slurry of PVC is as follows: 74% by wt $Cl_2$ for 69% Cl CPVC; 82% by wt $Cl_2$ for 70% Cl CpVC; 91% by wt $Cl_2$ for 71% Cl CPVC; 100% by wt $Cl_2$ for 72% Cl CPVC; 110% by Wt $Cl_2$ for 73% Cl CPVC; 135% by wt for 75% Cl CPVC.

The peroxy catalyst for both steps may be added right at the outset, or in increments. Typically, all catalyst is added at the outset, and a mixture of catalysts is used, one decomposing at a lower temperature than the other. The importance of the overall reaction being completed relatively quickly becomes evident when one realizes that the effectiveness of the organic peroxy catalysts used is short-lived under the conditions of the reaction.

The pressure at which the reaction is carried out will depend upon the peroxy catalyst used and the temperature at which the reaction is carried out. The higher the temperature, the more quickly will the resin be chlorinated provided the temperature is not so high as to generate "fish eyes". The pressure is preferably in the range from about 25 psig to about 300 psig.

Upon initiation of the chlorination reaction in the first step, the reaction mass gradually increases in temperature which is maintained below 100° C. until the relative pressure of Cl rolls over (begins to decrease), then begins to stabilize, typically when the Cl content of the resin is about 67%-70%, depending upon the Cl content of the CPVC end product to be made. This marks the end of the first step.

In the second step, the chlorination will proceed simply by raising the temperature to about 130° C., particularly if the peroxy catalyst is a two-catalyst mixture, the second catalyst decomposing at the higher temperature of the second step. However, the time for reacting essentially all the chlorine to produce a CPVC of about 72% Cl content (say) may still be too long to be practical. Therefore, the second step is carried out in the presence of oxygen, as stated hereinabove, preferably with the addition of a slight excess of chlorine so that less than a 10% excess over stoichiometric is present in the reactor, the excess, if any, depending upon the Cl content of the end product to be made.

Upon completion of the second step, the reactor is depressurized and the CPVC in the slurry is conventionally recovered. Typically, the slurry is filtered and washed with water, then dried in a convection oven or hot air tower where the wet resin is recirculated with hot air until dry. The CPVC end product formed has a lower concentration of chlorine near its surface, causing said CPVC end product to fuse at the same temperature as another CPVC end product made by a conventional photo-slurry process, wherein the another CPVC contains a lower Cl content. For example, a 72% CPVC end product made by the process of this invention fuses at the same temperature as a 69% CPVC made by the photo-slurry process.

Though this invention is specifically described relative to the post-chlorination of PVC homopolymer, it may also be used to post-chlorinate other vinyl chloride resins. By "other vinyl chloride resins" we refer to resins containing a major proportion by weight of vinyl chloride, preferably those resins containing more than about 70% by weight of vinyl chloride, the balance being one or more suitable monoolefinically unsaturated comonomers. Such comonomers are exemplified by vinylidene chloride, olefins such as ethylene and propylene, vinyl aromatics such as styrene, vinyl esters such as vinyl acetate, acrylic acids and their derivatives such as ethyl acrylate, acrylamide and acrylonitrile, and vinyl heterocyclic compounds like pyridine.

Figure 2:
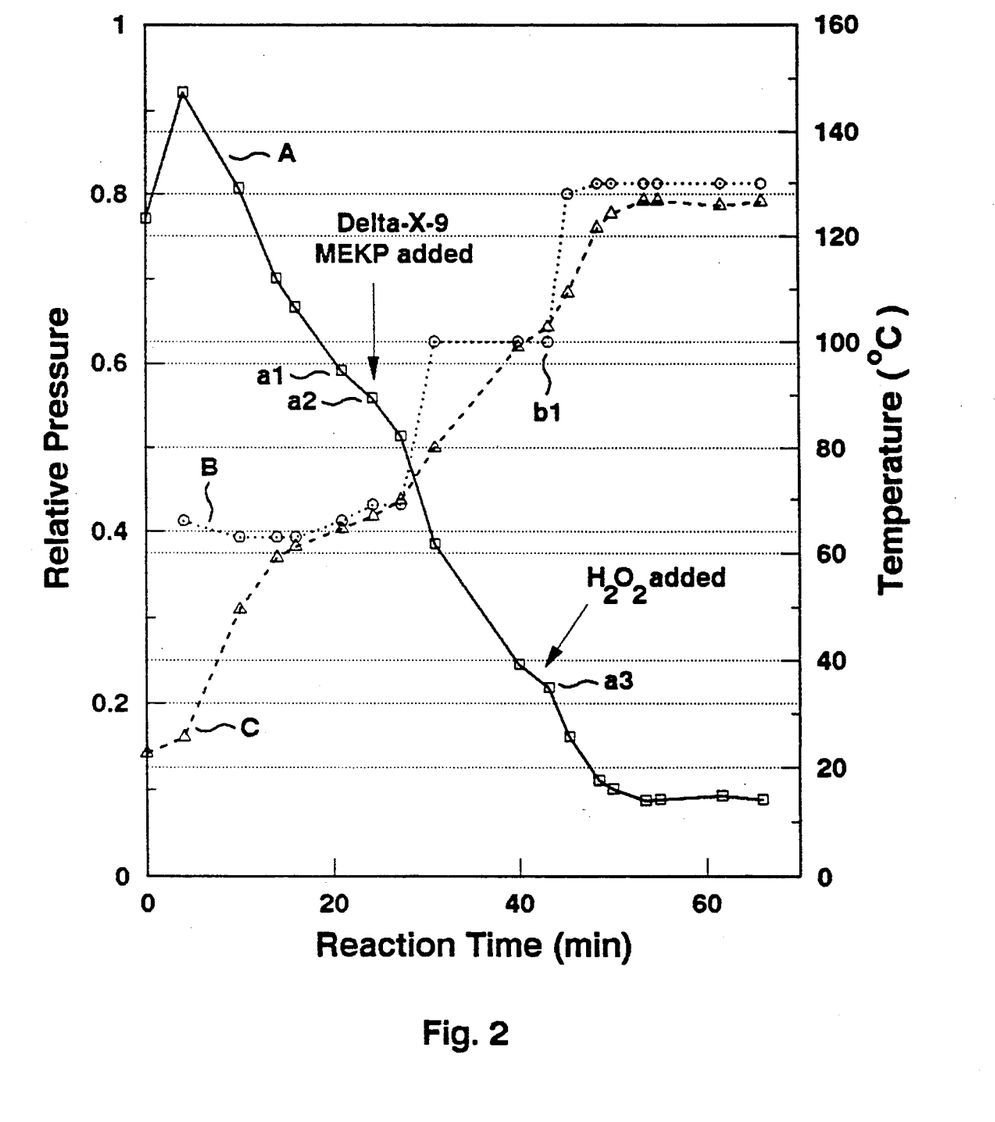
FIG. 2 graphically illustrates the course of a typical bench-scale (in a 2 gallon reactor) chlorination with the two-step process. The progress of the reaction is reflected in three curves plotted as a function of time, a first curve representing relative pressure of chlorine; the second, the temperature of the jacket of the reactor; and the third, the temperature of the reaction mass; during the period plotted the reaction yields CPVC with a Cl content of 72.2%.

Referring to FIG. 2, there is graphically depicted the record of a specific typical run in which the CPVC made in a 2 gallon reactor had a Cl content of 72.25%. Curve A is a plot of relative pressure of chlorine as the reactor's jacket is heated after a 1% over excess of molecular chlorine is injected into an aqueous slurry of PVC granules present in about 20% by weight of the slurry. The slurry includes MEK peroxide (Delta-X-9) in an amount about 0.02% by weight of the PVC, the MEK peroxide being dissolved in a solvent. Initially the relative pressure of chlorine is nearly 1 but begins to decrease as the slurry is warmed.

Curve B is a plot of the temperature of the reactor's jacket, and curve C represents the temperature of the slurry. When the relative pressure begins to stabilize, as indicated by the points $a_1$ and $a_2$, the first step of the process is nearing its end. An additional amount of catalyst is added and the temperature of the reactor's jacket is increased, raising the temperature of the slurry as chlorination proceeds. The relative pressure of chlorine continues to decrease until point $a_3$ where the relative pressure begins to stabilize. Molecular oxygen is generated in situ in the slurry by introducing enough hydrogen peroxide ($H_2O_2$) into the reactor to provide about 20 ppm of oxygen. Heating of the reactor jacket is continued while the temperature of the slurry climbs to about 132° C. until the relative pressure is less than 0.1 indicating that about 94% of the free chlorine is consumed (6 wt % excess remains).

The CPVC produced has a sufficiently low concentration of Cl near its surface to be readily fusible at a temperature of 162° C. though the fused product is not clear. Such fusion occurs despite the CPVC having a higher glass transition temperature ($T_g$) and a lower fusion temperature than another differently produced microporous macrogranular CPVC having essentially the same specific gravity and a like Cl content. Since there is no practical way to determine the precise concentration of Cl near the surface, tests by comparing fusion is the best method for doing so. Such fusion tests indicate that the CPVC produced by our process is distinguishable over that produced by known processes.

Reverting again to FIG. 1, the curve identified by letter C represents the progress of a commercial photochlorination process practiced as described in the Olson '898 patent. It is evident that it will take a very long time to make a CPVC product having a Cl content of 72%. The curve identified by letter D represents the progress of the reaction described in the high temperature chlorination process practiced as described in Example 1 of the Young '848 patent. It is evident that it will take even longer to make a CPVC product having a Cl content of 72% than it would by the Olson process. In each case, chlorination at the surface of the granules impedes further chlorination so that a Cl content above 69% becomes geometrically more difficult since the curves for each process tend to flatten out above 69%.

In each of the prior art processes, note the length of time it takes to provide a Cl content of 67% in the CPVC end product. It is clear that the length of time to provide a Cl content in the range above 70% will be at least three times as long as with the novel process, if such a high Cl content CPVC can be made at all with the prior art processes.

Specific additional illustrative examples of the process in a bench scale reactor are provided herebelow.

EXAMPLE 1

To make 72% Cl content CPVC with incremental addition of peroxy catalyst in the first step, and in the second step, by addition of hydrogen peroxide to provide oxygen:

A 2 gal reactor is charged with 4 L of demineralized water, 700 gm Geon* PVC 103EPF76-TR which is mixed at room temperature (20° C.) while adding 0.4 gm Delta-X-9 MEK peroxide (from Atochem North America) in 10 ml of a chlorinated paraffin oil DO-10 (from Dover Chemical). The reactor is closed, evacuated to 4 psia, then pressurized with nitrogen to 100 psia and left it while being stirred for 30 min. The reactor is then vented and evacuated to 5 psia at 15° C. Then 570 ml of liquid chlorine (6% excess over stoichiometric) are charged at room temperature, and heating the slurry commenced. Referring to FIG. 2, the temperature increases from 25° C. to 70° C. over a period of 25 min and at point $a_1$ on curve A, where the reaction begins to slow, an additional 0.2 gm of the same MEK peroxide is added in 5 ml of DO-10 oil. The reaction begins to slow when the pressure is 172 psia. The pressure continues to decrease as additional chlorine reacts.

Evidence that the reaction has speeded up is provided by the steep descent of curve A after point $a_2$. The jacket temperature is increased at point $b_1$ in preparation for the second step. When the temperature reaches 99° C. 5 ml of 3% $H_2O_2$ at point $a_3$ which was diluted with 45 cc of demineralized water. The $H_2O_2$ immediately decomposes in the acidic environment to provide molecular oxygen in situ. Curve C indicates that the temperature of the slurry is increasing smoothly while the reaction proceeds exothermically and the effect of heating the water jacket is felt. A further acceleration of the reaction is evidenced by the steep drop of the curve from point $a_3$ until after about 55 min the reaction is deemed complete. The temperature of the slurry is maintained at about 127° C.

Upon analysis the CPVC is found to have 72.2% by wt Cl. This indicates that 94% of the chlorine charged was reacted. The unreacted chlorine is distributed between the resin, the water and the space above the slurry.

No addition of peroxy catalyst was made after the injection of hydrogen peroxide since the rate of reaction was sufficiently fast; more catalyst could have been added to further accelerate the reaction.

EXAMPLE 2

To make 70% Cl content CPVC without providing added molecular oxygen, but adding additional catalyst in the second step:

In a manner analogous to that described in example 1 hereinabove, 800 gm of PVC in 4.6 L of water were slurried with 0.35 gm of Lupersol 10M75 (t-butylperoxyneodecanoate) in 10 gm of mineral oil. After evacuating to 10 psia, gaseous chlorine was charged until the pressure reached 30 psia. The reactor was again evacuated to 10 psia and again gaseous chlorine was added until the pressure was 34 psia. The reactor was again evacuated to 10 psia, and the reaction was started after charging 550 ml of liquid chlorine at room temperature. The reaction proceeds until the temperature reaches 65° C. and the pressure is 207 psia. The slurry is heated when the reaction temperature is 68° C. and 200 psia.

When the temperature reaches 94° C. and 140 psia, the second step is initiated by injecting 0.2 gm of Lupersol t-butylperbenzoate in 10 gm of mineral oil. No additional oxygen is introduced. The temperature increases to 118° C. and the pressure drops to 31 psia indicating the reaction is complete.

Upon analysis the CPVC is found to have 70.1% by wt Cl. At a pressure of 3i psia essentially no free chlorine remains. The time for reaction is about 10 hr.

In a manner generally analogous to that described, using substantially the same amounts of PVC resin and substantially stoichiometric amounts of chlorine, the following additional variations of the process are carried out:

(1) all the peroxy catalyst to be added has a 10 hr decomposition temperature in the range from 50° C. to 120° C., and is added during the first step; and, the second step is carried out in the absence of added oxygen, relying upon residual oxygen to catalyze the reaction in the second step;

(2) all the peroxy catalyst to be added has a 10 hr decomposition temperature in the range from 50° C. to 120° C., and is added in two or more increments during the first step; and, the second step is carried out with the addition of molecular oxygen, or a molecular-oxygen generating agent to provide a desired level of oxygen;

(3) a major portion by weight of the peroxy catalyst to be added has a 10 hr decomposition temperature in the range from 50° C. to 120° C. and is added during the first step in an amount sufficient to decrease the relative pressure to at least 0.3, preferably less than 0.2; and, the remainder of the catalyst is added at the commencement of, or during the second step in combination with the addition of molecular oxygen, or a molecular-oxygen generating agent to provide a desired level of oxygen;

(4) a major portion of the peroxy catalyst to be added, is a first catalyst which has a 10 hr decomposition temperature in the range from 50° C. to 120° C., and it is added during the first step in an amount sufficient to decrease the relative pressure to at least 0.3, preferably less than 0.2; and, the remaining minor amount added is a second peroxy catalyst which has a 10 hr decomposition temperature in the range from 80° C. to 200° C., at the commencement of, or during the second step, optionally in combination with the addition of molecular oxygen, or a molecular-oxygen generating agent to provide a desired level of oxygen.

Figure 3:
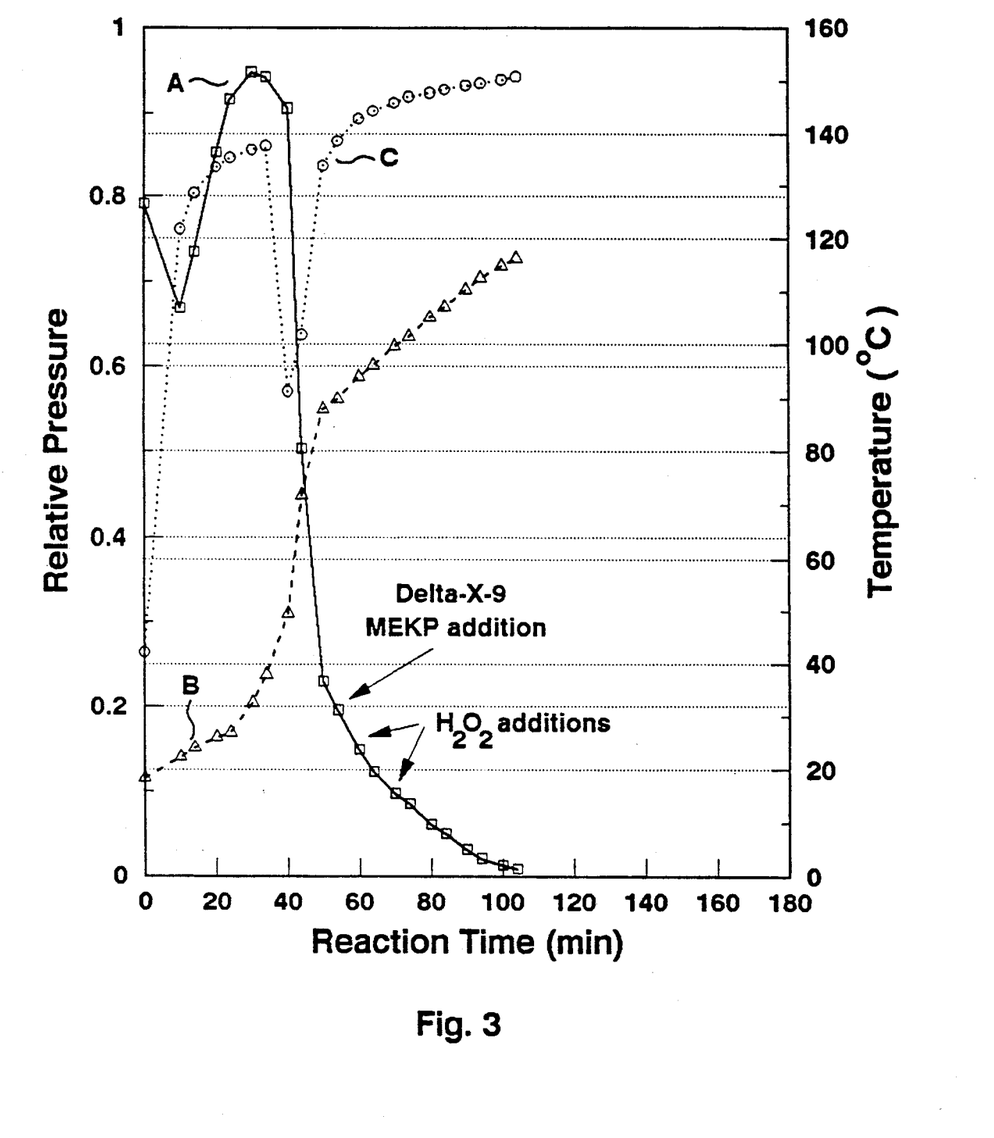
FIG. 3 graphically illustrates the course of a typical pilot plant (in a 200 gal glass-lined reactor) chlorination with the two-step process in which the relative pressure of chlorine, the temperature of the reactor's jacket, and the temperature of the reaction mass are plotted as a function of time during which the reaction proceeds until the Cl content of the CPVC is 70.3%.

Referring to FIG. 3, the curves plotted are for the reaction using appropriately scaled-up quantities of reactants charged to a 200 gal pilot plant reactor, in a manner analogous to that described for the 2 gallon reactor, to make a Cl content of about 70%. It will be seen that there is a substantial lag time during which the jacket of the reactor is being heated. The relative pressure of Cl, shown in curve A, initially rises because much of the liquid Cl charged remains in solution while the reaction mass is being heated. Curve A begins to fall after the reaction mass reaches 30° C. and Cl is consumed rapidly, as seen by the precipitous drop of the relative pressure. An indication (not visible on the curve) that the relative pressure is stabilizing is obtained at about 50 min at which point a first injection of $H_2O_2$ is made. When the relative pressure again begins to stabilize, at about 80 min (again not visible on the curve) yet another injection of $H_2O_2$ is made. The temperature of the reaction mass does not exceed 120° C. at the end of the reaction which produced essentially quantitative yield of CPVC having a 70.3% Cl content.

Figure 4:
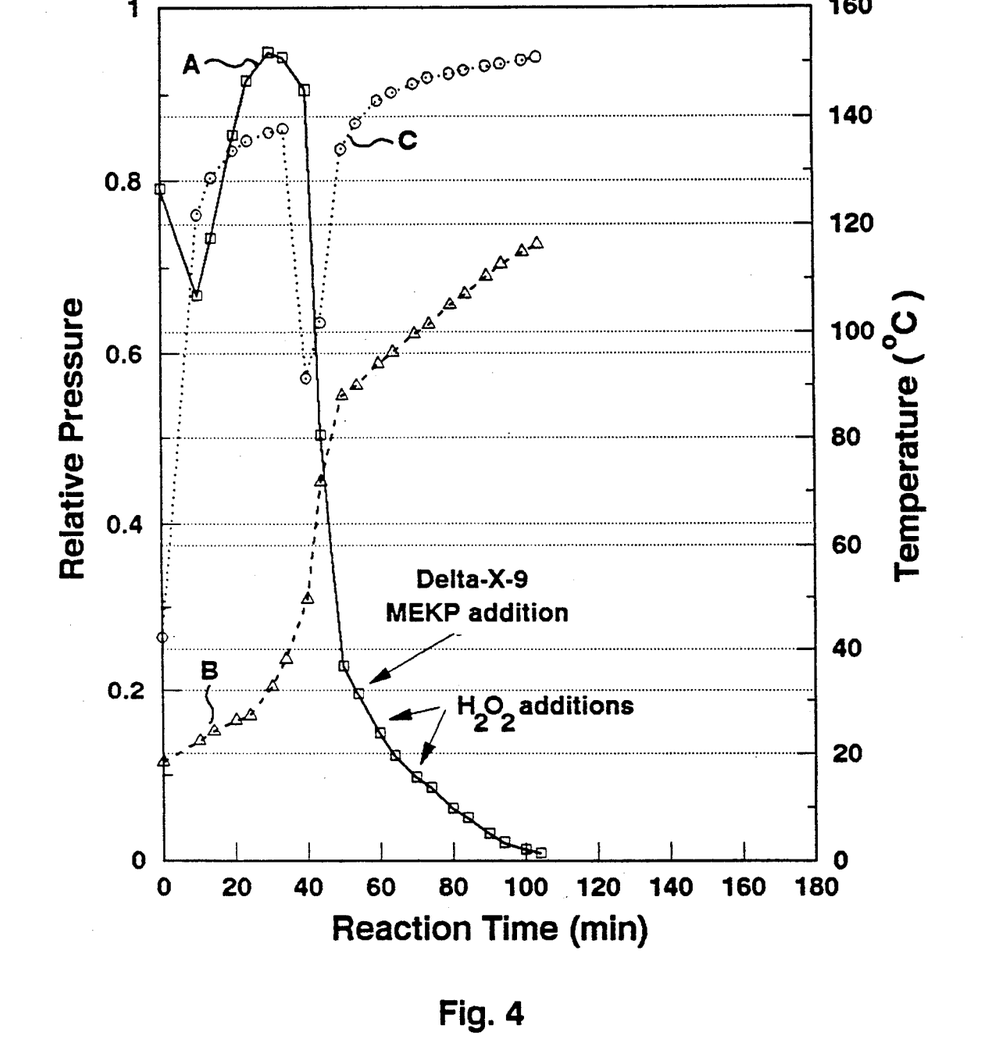
FIG. 4 graphically illustrates the course of a pilot plant chlorination, analogous to that described in FIG. 3, except that a second addition of organic peroxide catalyst is made in addition to the injection of $H_2O_2$.

Referring to FIG. 4, the curves plotted are for the reaction using the same quantities of reactants used in the run represented in FIG. 3, except that a minor portion by weight (of the total MEK peroxide to be added) was added at the end of the first step when it was indicated as described above. As before in FIG. 3, relative pressure of Cl, shown in curve A, initially rises then falls substantially overlapping the corresponding portion of the curve in FIG. 3. To increase the speed of the reaction in the second step, two successive injections of $H_2O_2$ are made. The result is a quicker depletion of the Cl in the reactor yet the temperature of the reaction mass does not exceed 120° C.

Figure 7:
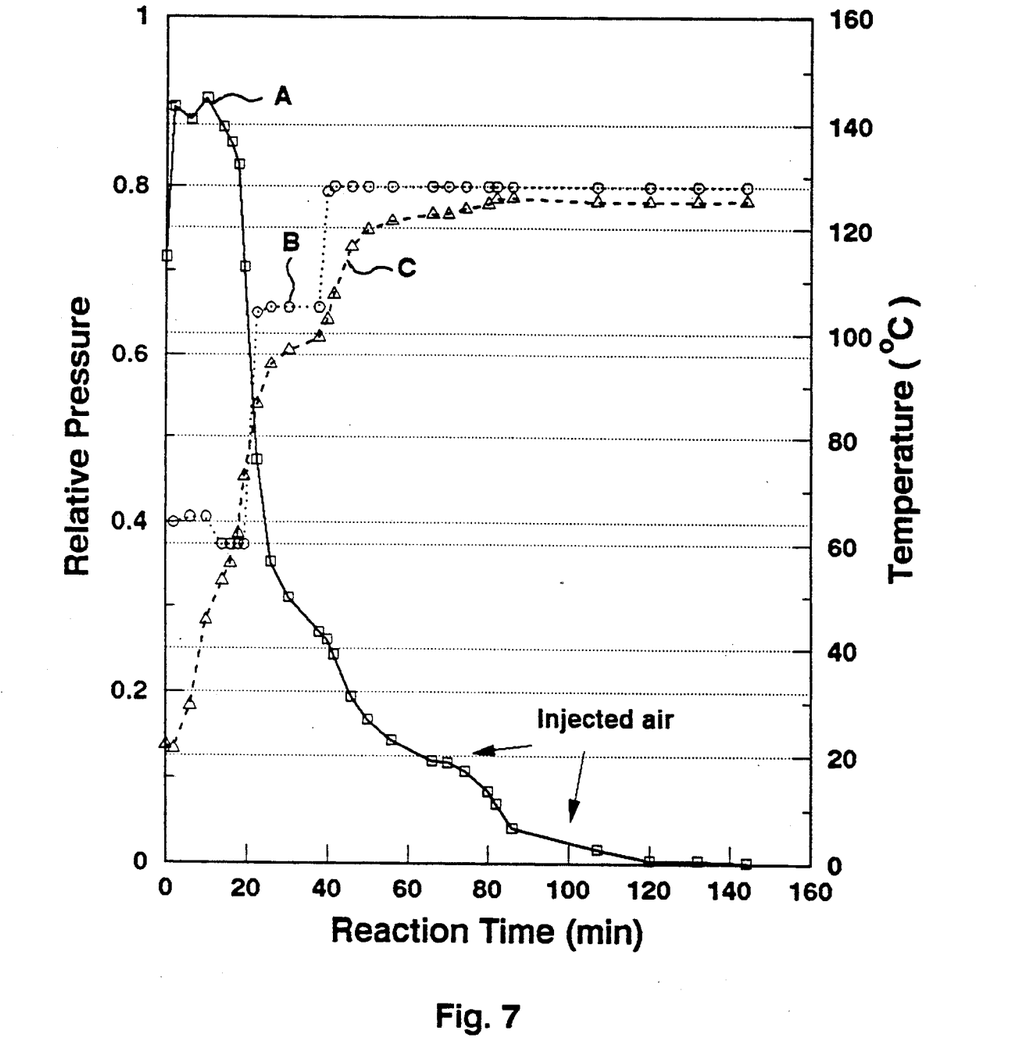
FIG. 7 graphically illustrates the course of a bench-scale (in a 2 gal reactor) chlorination with the two-step process in a manner analogous to that of the reaction shown in FIG. 2, except that air is used to provide oxygen in the second step, and the reaction yields CPVC with a Cl content of 74.5%.

Referring to FIG. 7, the curves plotted are for chlorination of an aqueous PVC slurry in which a stoichiometric amount of liquid Cl, sufficient to produce CPVC with a 75% Cl content, is charged to the reactor, along with 0.5 gm of Delta-X-9 MEK peroxide in tetrachloroethane. After the jacket temperature was heated to 60° C. the relative pressure of Cl begins to fall as shown by curve A. As shown by curve B, after about 20 min, the jacket temperature is increased to about 105° C. to increase the speed of the reaction. After about 40 min, the jacket temperature is again increased to 130° C. to maintain the speed of the reaction. The relative pressure begins to level off when the temperature of the reaction mass exceeds 120° C. and the total pressure in the reactor reaches 140 psia (read on the gauge, not visible on the graph). After about 70 min, pressurized air is injected into the reactor for 30 secs until the total pressure is 142 psia. The temperature of the reaction mass increases slightly while Cl is consumed and the total pressure in the reactor drops to about 120 psia. Since much Cl still remains unreacted after 100 min, additional air is injected for 30 sec to raise the reactor pressure to 125 psia. The temperature of the reaction mass then climbs to 125° C. while the total pressure drops to about 50 psia indicating the relative pressure of Cl is very small. About 99% of the Cl charged is reacted and the Cl content of the CPVC is about 74.5%.

Figure 5:
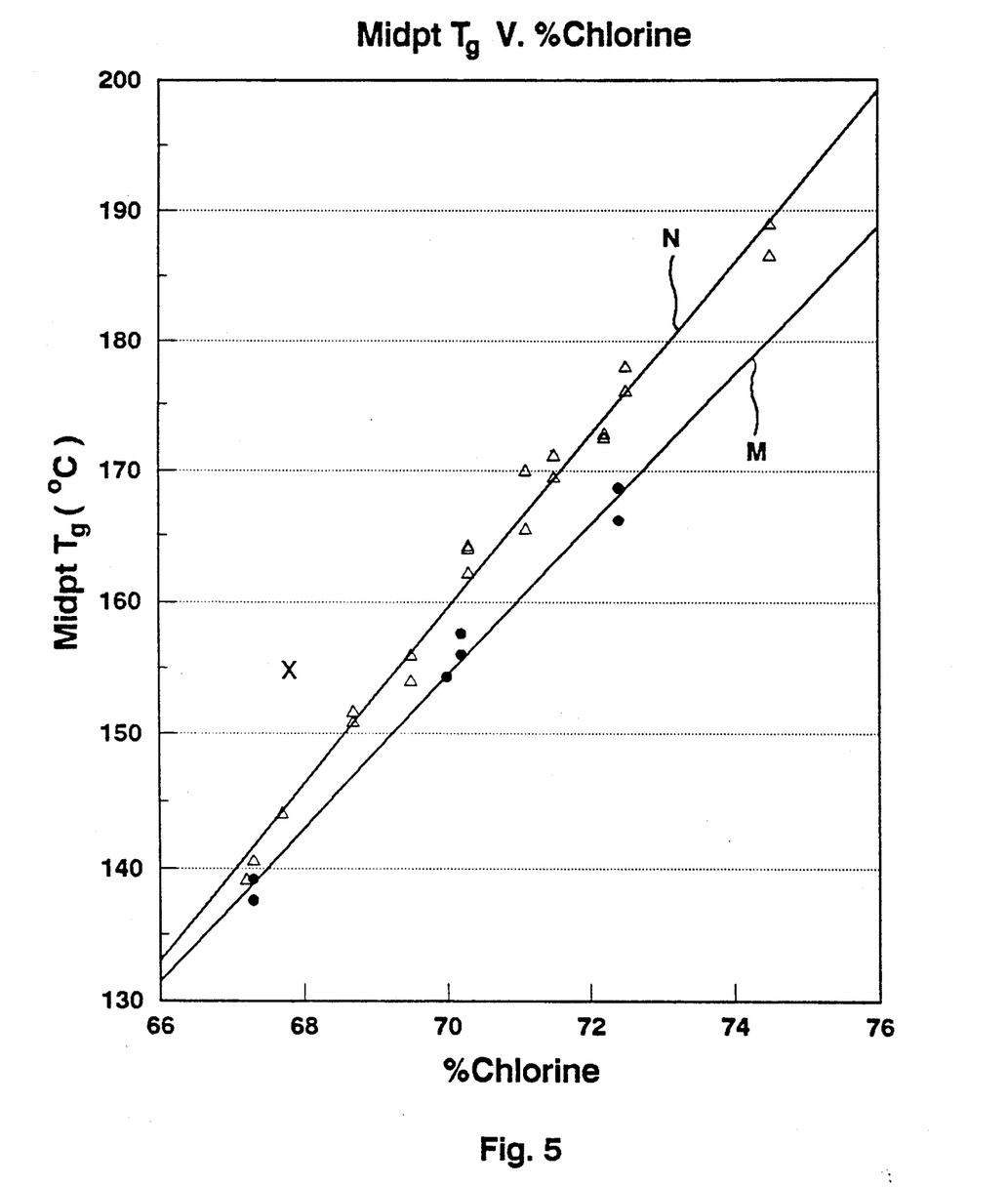
FIG. 5 shows a pair of straight line plots of the midpoint $T_g$ (° C.) as a function of the chlorine content, of two (first and second) sets of samples of CPVC, and a single point for a sample of CPVC produced by the process of illustrative example 1 in the Ackerman '189 patent. The first set of samples is produced by the prior art aqueous photo-slurry process; the second set of samples is produced by the two-step process. The samples from the first set have lower $T_g$s, at corresponding Cl content, than those of the second set.

Referring to FIG. 5, it is seen that curve M is a plot of the midpoint $T_g$s for samples of photo-slurry chlorinated PVC resin having values indicated by the solid circles. The curve N, for values indicated by the triangles, is a plot of the midpoint $T_g$s for samples of CPVC produced by the two-step process. Note that the variation in $T_g$ values for the same Cl content is less for samples made in the two-step process than that for the photo-chlorinated samples. The midpoint $T_g$ of 155° C., designated X, is for the CPVC sample with 67.8% Cl made by the Ackerman '189 process, and this midpoint is higher than that of either the sample of the two-step process or the photo-chlorinated process, each having 67.8% Cl content.

Figure 6:
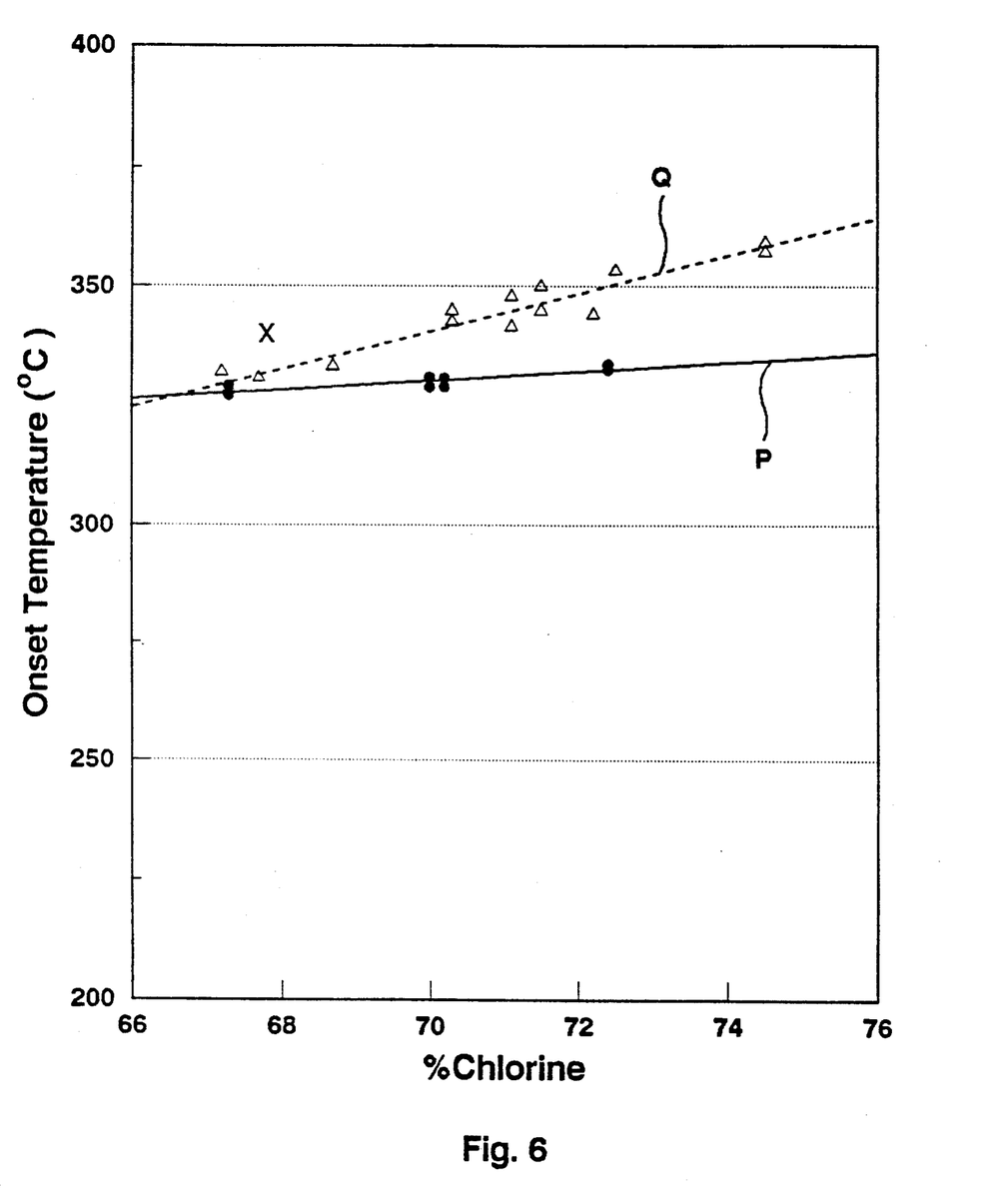
FIG. 6 is a plot of the TGA Onset Temperature (° C.) as a function of the chlorine content of the two sets of CPVC samples (for which the $T_g$s were presented in FIG. 4) showing that the TGA onset temperatures for the samples of the first set (the photo-slurry process) are lower than those for samples of CPVC with corresponding Cl content, made by the two-step process; also shown is a single point for a sample of CPVC produced by the process of illustrative example 1 in the Ackerman '189 patent.

Referring to FIG. 6, the straight lines indicated by reference letters P and Q are for the TGA onset temperatures for samples made by the photo-slurry process (indicated by solid circles) and for samples made by the two-step process (indicated by triangles). The TGA onset temperature is determined by thermogravimetric analysis to indicate thermal stability of a resin. This temperature is conventionally determined by the intersection of the initial wt % baseline with the tangent of the wt % base line during decomposition. The point marked X is the TGA onset temperature for the Ackerman sample. It is evident that the TGA onset temperatures for samples made with the two-step and Ackerman processes are higher than corresponding temperatures for the samples from the photo-slurry process, indicating lower thermal stability for the latter samples.

The effect of the differences in distribution of Cl within the granules of CPVC and the resulting physical properties, is evidenced in a comparison of flexural strengths of samples made from the various CPVC samples. The tests were three-point flexural strength tests run with sample strips over a 2 inch span as specified in ASTM D-790-86 in an Instron using a sampling rate of 5 points/sec and a crosshead speed of 0.5 in/min. Each strip is 1 inch wide and 0.125 inch thick cut from a molded sheet, the temperature at which the sheet was molded being noted in the Tables below.

In the following Table 1 the measured yield energy (lb-in) of strips made from CPVC having essentially the same Cl content of about 70%, are set forth side-by-side.

TABLE 1

| Molding Temperature °C. | Strips* from the Two-step process Yield-energy (lb-in) | Strips▲ from the Photo-slurry process Yield-energy (lb-in) |
|---|---|---|
| 170 | 10.32 | 0.615 |
| 185 | 8.87 | 0.835 |
| 200 | 10.90 | 4.636 |

*70.3% Cl; ▲70.0% Cl

It is evident that the CPVC in the strips from the photo-slurry process are not completely fused at 170° C. and 185° C. since their yield energies are about an order of magnitude (10 times) smaller. Even when the photo-slurry CPVC is fused at 200° C. the yield energy is less than one-half that of the sample made with CPVC from the two-step process.

As will be evident from the following Table 2, the order of magnitude difference in yield energies is noted even with strips made from CPVC having more than 72% Cl, though the yield energy decreases as Cl content increases.

TABLE 2

| Molding Temperature °C. | Strips* from the Two-step process Yield-energy (lb-in) | Strips▲ from the Photo-slurry process Yield-energy (lb-in) |
|---|---|---|
| 170 | 3.361 | 0.301 |
| 185 | 2.455 | 0.303 |
| 200 | 2.586 | 0.221 |

*72.2% Cl; ▲ 72.4% Cl

As will be evident, the intragranular Cl distribution of 72.4% Cl CPVC made with the photo-slurry process has about one-tenth the flexural strength of the strip made with the two-step process. It appears that the prior art strip does not fuse as completely at 200° C. as does the two-step strip, and to the extent it is fused, has greatly different flexural strength.

The commercial importance of the process derives not only from the unexpectedly superior properties of a water-chlorinated PVC product having >69% Cl content, but also from the relative speed of the two-step reaction compared with that of the currently dominant photo-slurry process as exemplified in the Olson et al '898 patent.

A comparison of the process times for the prior art and novel processes was made by running the following charges in the externally jacketed 200 gallon pilot plant reactor equipped as stated:

| | Charge for Photo-Slurry Process: |
|---|---|
| Reactants | 250 lb 103EPF76-TR PVC |
| | 1169 lb water |
| Reactor | titanium, fitted with flat-bladed turbine |
| Results | CPVC having 70.2% Cl in 5.78 hr |
| | Charge for Two-Step Process: |
| Reactants | 250 lb 103EPF76-TR PVC |
| | 1169 lb water |

| | -continued |
|---|---|
| | 172 lb liquid chlorine |
| Reactor | glass-lined fitted with glass-lined 3-blade retreat curved agitator |
| Results | CPVC having 70.3% Cl in 1.67 hr |

It is evident that the two-step process is more than three times as fast as the photo-slurry process and produces superior product without undue problems controlling the exothermic reaction when carried out as described hereinabove.

Having described the novel two-step process in detail and having presented illustrative examples of the best mode for practicing the invention, it will be evident that the invention has provided an effective solution to a difficult problem. It is therefore understood that no undue restriction is to be imposed by reason of the specific embodiments illustrated and discussed, except as provided by the following claims.

We claim:

1. A two-step process for post-chlorinating an aqueous suspension of a granular microporous poly(vinyl chloride) ("PVC") resin having a chlorine content of about 57% Cl, until said PVC resin is converted to chlorinated poly(vinyl chloride) CPVC end product containing at least 70% Cl by weight, the process comprising, in a first step,
chlorinating said PVC at a starting temperature in the range from about 30° C. to 75° C., in the absence of liquid chlorine and free oxygen, in the presence of at least a stoichiometric amount of chlorine, but less than a 10% excess over that required to produce said CPVC end product, and a catalytic amount of an organic peroxy catalyst, sufficient to produce first step CPVC having an intermediate Cl level of chemically bound Cl in the range from 67%–72% by weight, said peroxy catalyst having a 10 hr half-life in the range from 30°–130° C.; and, in a second step,
further chlorinating said CPVC formed, in the presence of at least a stoichiometric amount of chlorine, but less than a 10% excess over that required to produce said CPVC end product, at a temperature in the range from 90° C. to 130° C. until the Cl content in said CPVC end product is in the range from 70% to 75% by weight.

2. The process of claim 1 wherein said which said organic peroxy catalyst is selected from the group consisting of dialkyl peroxides and hydroperoxides; peroxy carboxylic acid esters; diorganoperoxycarbonates, diacyl peroxides and mixed anhydrides of organic sulfoperacids and carboxylic acids.

3. The process of claim 2 comprising in said first step, chlorinating said PVC with said organic peroxy catalyst in an amount less than about 0.5% by weight of the PVC, and said organic peroxy catalyst has a 10 hr half-life in the range from 50° C. to 120° C.

4. The process of claim 3 wherein said first and second steps are carried out in the absence of added hydrochloric acid, and, wherein further chlorinating said first step CPVC results in a gain of at least 3% Cl content within about 30 min at a controllable temperature lower than the $T_g$ of said first step CPVC, substantially independent of volume of said suspension.

5. The process of claim 4 wherein said second step is commenced in the presence of from 5–100 ppm of molecular oxygen, optionally generated in situ.

6. The process of claim 5 comprising in said first step, chlorinating said PVC in the presence of a first organic peroxy catalyst present in the range from 0.005% to 0.5% by weight of said PVC; and, in said second step, chlorinating said first step CPVC in the presence of a second organic peroxy catalyst present in the range from 0.005% to 0.5% by weight of said PVC; and, said second peroxy catalyst is the same as said first peroxy catalyst used in said first step, or different.

7. The process of claim 6 wherein said first peroxy catalyst has a 10 hr half-life in the range from 50° C. to 120° C.; and, wherein said second peroxy catalyst has a 10 hr half-life in the range from 100° C.–200° C., and, said second peroxy catalyst is different from said first.

8. The process of claim 6 wherein said hydroperoxide has a structure selected from the group consisting of

R—OOH    (I)

(II)

(III)

$$HOO-\underset{R^2}{\overset{R^1}{C}}-OO+\underset{R^2}{\overset{R^1}{C}}-OO\overline{)_n}C-OOH$$   (IV)

and, (V)

where
R is a hydrocarbyl group having from 4 to 24 carbon atoms;
$R^1$ and $R^2$ represent $C_1$–$C_{20}$ alkyl, or $C_7$–$C_{24}$ aralkyl, and $R^1$ and $R^2$ may be the same or different.

9. The process of claim 6 wherein said second step is commenced by introducing hydrogen peroxide to generate said molecular oxygen.

10. The process of claim 8 wherein said second step is commenced by introducing hydrogen peroxide to generate said molecular oxygen, and introducing said second peroxy compound which may be the same as that used in said first step, or different; whereby said PVC is chlorinated to contain about 75% Cl within about 3 hr substantially independent of volume of said suspension, the time being measured from the time in said first step, when said suspension charged with chlorine is warm enough to react sufficiently to decrease the relative pressure in the reactor.

11. The process of claim 10 wherein said second peroxy compound has a 10 hr half-life in the range from about 80° C. to 120° C.

12. A two-step process for post-chlorinating an aqueous suspension of a granular microporous poly(vinyl chloride) ("PVC") resin until it is converted to chlorinated poly(vinyl chloride) ("CPVC") end product containing a designated amount of Cl, the process comprising, in a first step,
(a) confining said aqueous suspension of PVC in a pressurizable reaction zone initially maintained at a temperature in the range from 20° C. to about 50° C., wherein said PVC is mixed in the absence of free oxygen with a substantially stoichiometric amount of molecular chlorine to yield said end product, said amount being insufficient to provide a distinct liquid chlorine phase, so as to form an acidic suspension of said PVC in the absence of added aqueous hydrochloric acid;
(b) adding an effective amount, sufficient to convert said
PVC to first step CPVC having a Cl content from 67%-72% by weight, of at least one organic peroxy catalyst selected from the group consisting of dialkyl peroxides and hydroperoxides; peroxy carboxylic acid esters; diorganoperoxycarbonates, diacyl peroxides and mixed anhydrides of organic sulfoperacids and carboxylic acids, while maintaining the temperature of said suspension below 100° C. for a period sufficient to provide said CPVC with said Cl content; and, in a second step,
(c) introducing a catalytic amount of molecular oxygen, or a molecular oxygen generating agent, also in the absence of added aqueous hydrochloric acid, and optionally with additional molecular chlorine, less than a 10% excess over stoichiometric to provide said designated amount of chlorine in said CPVC end product, and insufficient to provide a distinct liquid chlorine phase; and,
(d) raising the temperature of said suspension no higher than 130° C. for a time sufficient to allow additional chlorine to react with said first step CPVC until said designated level of Cl in said CPVC end product is attained but without exceeding the glass transition temperature of said CPVC end product.

13. The process of claim 12 wherein said hydroperoxide has a 10 hr half-life in the range from 50° C. to 120° C. and a structure selected from the group consisting of $$R-OOH \quad (I)$$

$$\begin{array}{c} R^1 \\ \diagdown \\ R^2 \end{array} C \begin{array}{c} O-OH \\ \diagup \\ O-OH \end{array} \quad (II)$$

-continued $$\begin{array}{c} R^1 \\ \diagdown \\ R^2 \end{array} C \begin{array}{c} OOH \quad HOO \\ \diagup \\ O-\!\!-\!\!-\!\!-\!\!O \end{array} C \begin{array}{c} R^1 \\ \diagdown \\ R^2 \end{array} \quad (III)$$

$$HOO-\underset{R^2}{\overset{R^1}{\underset{|}{C}}}-OO\underset{}{\overset{}{\underset{}{+}}}\underset{R^2}{\overset{R^1}{\underset{|}{C}}}-OO\underset{}{\overset{}{\underset{}{+}}}_n C-OOH \quad (IV)$$

and, $$\begin{array}{c}
R^1 \diagdown \diagup R^2 \\
C-O-O \\
O \diagup \qquad \diagdown \diagup R^1 \\
| \qquad \qquad C \\
O \diagdown \qquad \diagup \diagdown R^2 \\
C-O-O \\
R^1 \diagup \diagdown R^2
\end{array} \quad (V)$$

where
R is a hydrocarbyl group having from 4 to 24 carbon atoms; and,
$R^1$ and $R^2$ represent $C_1$-$C_{20}$ alkyl, or $C_7$-$C_{24}$ aralkyl, and $R^1$ and $R^2$ may be the same or different.

14. The process of claim 12 wherein a first portion of said hydroperoxide is added in said first step, and a second portion of said hydroperoxide is added during said second step, and said hydroperoxide is the only peroxy catalyst added.

15. The process of claim 13 wherein said hydroperoxide is added in said first step, and an additional amount of said peroxy catalyst having a 10 hr half-life in the range from about 80° C. to 120° C. is added during said second step.

16. The process of claim 13 wherein a major portion by weight of said hydroperoxide having a 10 hr half-life in the range from 50° C. to 120° C. is added during the first step, and the remainder of said catalyst is added at the commencement of, or during the second step in combination with addition of molecular oxygen, or a molecular-oxygen generating agent to provide a desired level of oxygen.

17. The process of claim 12 wherein a major portion by weight of said hydroperoxide catalyst having a 10 hr decomposition temperature in the range from 50° C. to 120° C. is added as a first catalyst during the first step, and a minor amount by weight is added as a second catalyst having a 10 hr decomposition temperature in the range from 80° C. to 200° C., at the commencement of, or during the second step.

18. The process of claim 12 wherein said peroxy catalyst is introduced as a solution in an organic solvent in an amount insufficient to affect the physical characteristics of said CPVC formed, and said CPVC end product has a Cl content in the range from 71-74% by weight Cl.

* * * * *